United States Patent
Gopalakrishnan et al.

(10) Patent No.: US 11,365,711 B2
(45) Date of Patent: Jun. 21, 2022

(54) ENERGY STORAGE SYSTEM WITH MULTIPLE BATTERY MODULES FOR A VEHICLE PROPULSION SYSTEM

(71) Applicant: GM Global Technology Operations LLC, Detroit, MI (US)

(72) Inventors: Venkatesh Gopalakrishnan, Rochester Hills, MI (US); Chandra S. Namuduri, Troy, MI (US); Suresh Gopalakrishnan, Troy, MI (US); Dongxu Li, Troy, MI (US); Chunhao J. Lee, Troy, MI (US); Neeraj S. Shidore, Novi, MI (US); Norman K. Bucknor, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 61 days.

(21) Appl. No.: 17/085,388

(22) Filed: Oct. 30, 2020

(65) Prior Publication Data

US 2022/0136475 A1 May 5, 2022

(51) Int. Cl.
*F02N 11/08* (2006.01)
*H02J 7/00* (2006.01)

(52) U.S. Cl.
CPC ........ *F02N 11/0866* (2013.01); *H02J 7/0013* (2013.01); *H02J 7/0048* (2020.01); *H02J 7/007182* (2020.01); *H02J 7/007194* (2020.01); *F02N 2200/061* (2013.01); *F02N 2200/064* (2013.01); *H02J 2207/20* (2020.01)

(58) Field of Classification Search
CPC ............. F02N 11/0866; F02N 11/0825; F02N 2200/061; F02N 2200/064; H02J 7/0013; H02J 7/0048; H02J 7/007182; H02J 7/007194; H02J 2207/20
USPC ....... 123/179.3, 179.4, 179.25; 701/112, 113
See application file for complete search history.

(56) References Cited

U.S. PATENT DOCUMENTS 11,162,468 B2 * 11/2021 Nakayama .............. F02N 11/04

* cited by examiner

*Primary Examiner* — Hai H Huynh
(74) *Attorney, Agent, or Firm* — Vivacqua Crane, PLLC

(57) ABSTRACT

An energy storage system (ESS) for a vehicle propulsion system includes a first battery electrically coupled to a first voltage bus, a second battery electrically coupled to a second voltage bus, and a bidirectional DC/DC power converter electrically coupled to the voltage buses. A starter for cranking an engine is electrically coupled to the first voltage bus. A controller executes computer code stored in memory. The computer code is configured to operate the converter in a boost mode to transfer power from the second voltage bus to the first voltage bus, in response to the controller determining that: a power capability of the first battery is below a power demand on the first voltage bus; a state of charge of the first battery is below a state of charge threshold; or a temperature of the first battery is below a temperature threshold.

20 Claims, 6 Drawing Sheets

ENERGY STORAGE SYSTEM WITH MULTIPLE BATTERY MODULES FOR A VEHICLE PROPULSION SYSTEM

INTRODUCTION

The present disclosure generally relates to propulsion systems of vehicles, and more particularly relates to an energy storage system with multiple battery modules for improving the performance of motor vehicles.

Automotive manufacturers are continuously investigating battery modules for propulsion systems of motor vehicles. Below freezing temperatures can drain power from a conventional battery, which can in turn lead to difficulty with starting an internal combustion engine, restrict regenerative braking, decrease vehicle cruise range, and slow charging of the battery. To avoid these adverse effects on vehicle performance, manufacturers can replace the comparably smaller conventional battery with a larger and more powerful battery. However, the larger battery can be significantly more expensive than the smaller conventional battery.

Thus, while existing propulsion systems of electric vehicles achieve their intended purpose, there is a need for a new and improved energy storage system for a vehicle propulsion system that address these issues.

SUMMARY

According to several aspects of the present disclosure, an energy storage system (ESS) for a propulsion system of a motor vehicle includes a first battery electrically coupled to a first voltage bus, a second battery electrically coupled to a second voltage bus, and a bidirectional DC/DC power converter ("converter") electrically coupled to the voltage buses. The ESS further includes a starter electrically coupled to the first voltage bus and mechanically coupled to an engine for cranking the engine during a cranking event. The ESS further includes a controller electrically coupled to the converter and the batteries. The ESS further includes a memory, which is electrically coupled to the controller and stores computer code for execution by the controller. The computer code is configured to operate the converter in a boost mode to transfer power from the second voltage bus to the first voltage bus, in response to the controller determining that: a power capability of the first battery is below a power demand on the first voltage bus; a state of charge of the first battery is below a minimum state of charge threshold associated with the first battery; or a temperature of the first battery is below a minimum temperature threshold associated with the first battery.

In one aspect, the computer code is configured to operate the converter in a buck mode to transfer power from the first voltage bus to the second voltage bus, in response to the controller determining that the engine has started.

In another aspect, the ESS further includes a motor-generator unit ("MGU") for generating power during a battery regeneration event. The computer code is configured to set the converter to a standby mode to transfer power from the MGU to the first battery, in response to the controller determining that: a torque of the MGU is below zero; the power demand on the first voltage bus is above the power generated by the MGU; and at least one of: the state of charge of the first battery is below the minimum state of charge threshold associated with the first battery; and the temperature of the first battery is below the minimum temperature threshold associated with the first battery.

In another aspect, the computer code is configured to operate the converter in the buck mode to transfer a portion of the power generated by the MGU from the first voltage bus to the second voltage bus, in response to the controller determining that: the power demand on the first voltage bus is below the power generated by the MGU; and a state of charge of the second battery is below a minimum state of charge threshold associated with the second battery.

In another aspect, the computer code is configured to set a DC/DC output voltage of the converter to a maximum level, in response to the controller determining that the energy of the first battery is above an energy storage limit associated with the first battery.

In another aspect, the computer code is configured to set the DC/DC output voltage of the converter based on a regulated voltage control command ("RVC command"), in response to the controller determining that the energy of the first battery is below the energy storage limit.

In another aspect, the computer code is configured to operate the converter in the boost mode to provide torque assist by transferring power from the second voltage bus to the first voltage bus, in response to the controller determining that: the state of charge of the second battery is above the minimum state of charge threshold associated with the second battery; and the power demand on the MGU is above the power capability of the first battery.

In another aspect, the first battery is a 48-Volt battery, and the second battery is a 12-Volt battery.

According to several aspects of the present disclosure, a method is provided for operating an energy storage system (ESS) of a propulsion system for a motor vehicle. The ESS includes a first battery electrically coupled to a first voltage bus, a second battery electrically coupled to a second voltage bus, a bidirectional DC/DC power converter ("converter"), a starter, a motor-generator unit ("MGU"), a controller, and a memory storing computer code. The method includes the controller comparing a power capability of the first battery to a power demand on the first voltage bus during an engine crank event. The controller further compares a state of charge of the first battery to a minimum state of charge threshold associated with the first battery. The controller further compares a temperature of the first battery to a minimum temperature threshold associated with the first battery. The converter is operated in a boost mode to transfer power from the second voltage bus to the first voltage bus, in response to the controller determining that at least one of: the power capability of the first battery is below the power demand on the first voltage bus during the engine crank event; the state of charge of the first battery is below the minimum state of charge threshold associated with the first battery; and the temperature of the first battery is below the minimum temperature threshold associated with the first battery.

In one aspect, the converter is operated in a buck mode to transfer power from the first voltage bus to the second voltage bus, in response to the controller determining that the engine has started.

In another aspect, the controller determines a battery regeneration event, in response to the controller determining that a torque of the MGU is below zero. The controller compares a power demand on the first voltage bus to a power generated by the MGU. The controller further compares the state of charge of the first battery to a minimum state of charge threshold associated with the first battery. The controller further compares the temperature of the first battery to a minimum temperature threshold associated with the first battery. The converter is operated in the stand-by mode to transfer all power from MGU to the first battery, in response to the controller determining that the power demand on the first voltage bus is above the power generated by the MGU and at least one of: the state of charge of the first battery is below the minimum state of charge threshold associated with the first battery; and the temperature of the first battery is below the minimum temperature threshold associated with the first battery.

In another aspect, the controller compares a state of charge of the second battery to a minimum state of charge threshold associated with the second battery. The converter is operated in the buck mode to transfer a portion of the power of the MGU from the first voltage bus to the second voltage bus, in response to the controller determining that: the power demand on the first voltage bus is below the power generated by the MGU; and the state of charge of the second battery is below the minimum state of charge threshold associated with the second battery.

In another aspect, the controller compares an energy of the first battery to an energy storage limit associated with the first battery. The controller sets a DC/DC output voltage of the converter to a maximum level, in response to the controller determining that the energy of the first battery is above the energy storage limit. The controller sets the DC/DC output voltage of the converter based on a regulated voltage control command, in response to the controller determining that the energy of the first battery is below the energy storage limit.

In another aspect, the controller compares the power demand on the MGU to the power capability of the first battery. The converter is operated in the boost mode to provide torque assist by transferring power from the second voltage bus to the first voltage bus and MGU, in response to the controller determining that: the state of charge of the second battery is above the minimum state of charge threshold associated with the second battery; and the power demand on the MGU is above the power capability of the first battery.

According to several aspects of the present disclosure, a method is provided for operating an energy storage system (ESS) of a propulsion system for a motor vehicle. The ESS includes a 48-Volt battery electrically coupled to a first voltage bus, a 12-Volt battery electrically coupled to a second voltage bus, a bidirectional DC/DC power converter ("converter"), a starter, a motor generator unit ("MGU"), a controller, and a memory storing computer code. The method includes the controller comparing a power capability of the 48-Volt battery to a power demand on the first voltage bus during an engine crank event. The controller further compares a state of charge of the 48-Volt battery to a minimum state of charge threshold associated with the 48-Volt battery. The controller further compares a temperature of the 48-Volt battery to a minimum temperature threshold associated with the 48-Volt battery. The converter is operated in a boost mode to transfer power from the second voltage bus to the first voltage bus, in response to the controller determining that at least one of: the power capability of the 48-Volt battery is below the power demand on the first voltage bus and starter during the engine crank event; the state of charge of the 48-Volt battery is below the minimum state of charge threshold associated with the 48-Volt battery; and the temperature of the 48-Volt battery is below the minimum temperature threshold associated with the 48-Volt battery.

In one aspect, the converter is operated in a buck mode to transfer power from the first voltage bus to the second voltage bus, in response to the controller determining that the engine has started.

In another aspect, the controller determines a battery regeneration event, in response to the controller determining that a torque of the MGU is below zero. The controller compares a power demand on the first voltage bus to a power generated by the MGU. The controller further compares the state of charge of the 48-Volt battery to a minimum state of charge threshold associated with the 48-Volt battery. The controller further compares the temperature of the 48-Volt battery to a minimum temperature threshold associated with the 48-Volt battery. The converter is operated in the stand-by mode to transfer all power generated by the MGU to the 48-Volt battery, in response to the controller determining that: the power demand on the first voltage bus is above the power generated by the MGU; and at least one of: the state of charge of the 48-Volt battery is below the minimum state of charge threshold associated with the 48-Volt battery; and the temperature of the 48-Volt battery is below the minimum temperature threshold associated with the 48-Volt battery.

In another aspect, the controller further compares a state of charge of the 12-Volt battery to a minimum state of charge threshold associated with the 12-Volt battery. The converter is operated in the buck mode to transfer a portion of the power generated by the MGU from the first voltage bus to the second voltage bus, in response to the controller determining that: the power demand on the first voltage bus is below the power generated by the MGU; and the state of charge of the 12-Volt battery is below the minimum state of charge threshold associated with the 12-Volt battery.

In another aspect, the controller compares an energy of the 48-Volt battery to an energy storage limit associated with the 48-Volt battery. The controller sets a DC/DC output voltage of the converter to a maximum level, in response to the controller determining that the 48-Volt battery is above the energy storage limit. The controller sets the DC/DC output voltage of the converter based on a regulated voltage control command, in response to the controller determining that the 48-Volt battery is below the energy storage limit.

In another aspect, the controller compares the power demand of the MGU to the power capability of the 48-Volt battery. The converter is operated in the boost mode to provide torque assist for transferring power from the second voltage bus to the first voltage bus, in response to the controller determining that: the state of charge of the 12-Volt battery is above the minimum state of charge threshold associated with the 12-Volt battery; and the power demand on the first voltage bus by the MGU is above the power capability of the 48-Volt battery.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

An exemplary energy storage system ("ESS") includes a controller that operates a bidirectional DC/DC power converter ("converter") to manage the flow of energy to and from multi-chemistry battery modules of different voltages to maximize the capture and use of regenerative energy. As described in detail below, the ESS selectively operates the converter in a boost mode, a standby mode, or a buck mode, in response to power demand on the ESS, power capability of the batteries, the state of charge of the batteries, and the temperature of the batteries. The controller operates the converter in a boost mode to start an engine or provide torque assist. The controller operates the converter in a buck mode for efficiently charging the batteries. The controller operates the converter in a standby mode for transferring power from a portion of the batteries to an electric machine, such as a starter. In addition, the controller also operates the converter in a standby mode for charging only a portion of the batteries.

The controller operates the converter for the practical application of maximizing the capture and use of regenerative energy by multiple batteries to improve vehicle performance and fuel economy. To that end, techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions.

Figure 1:
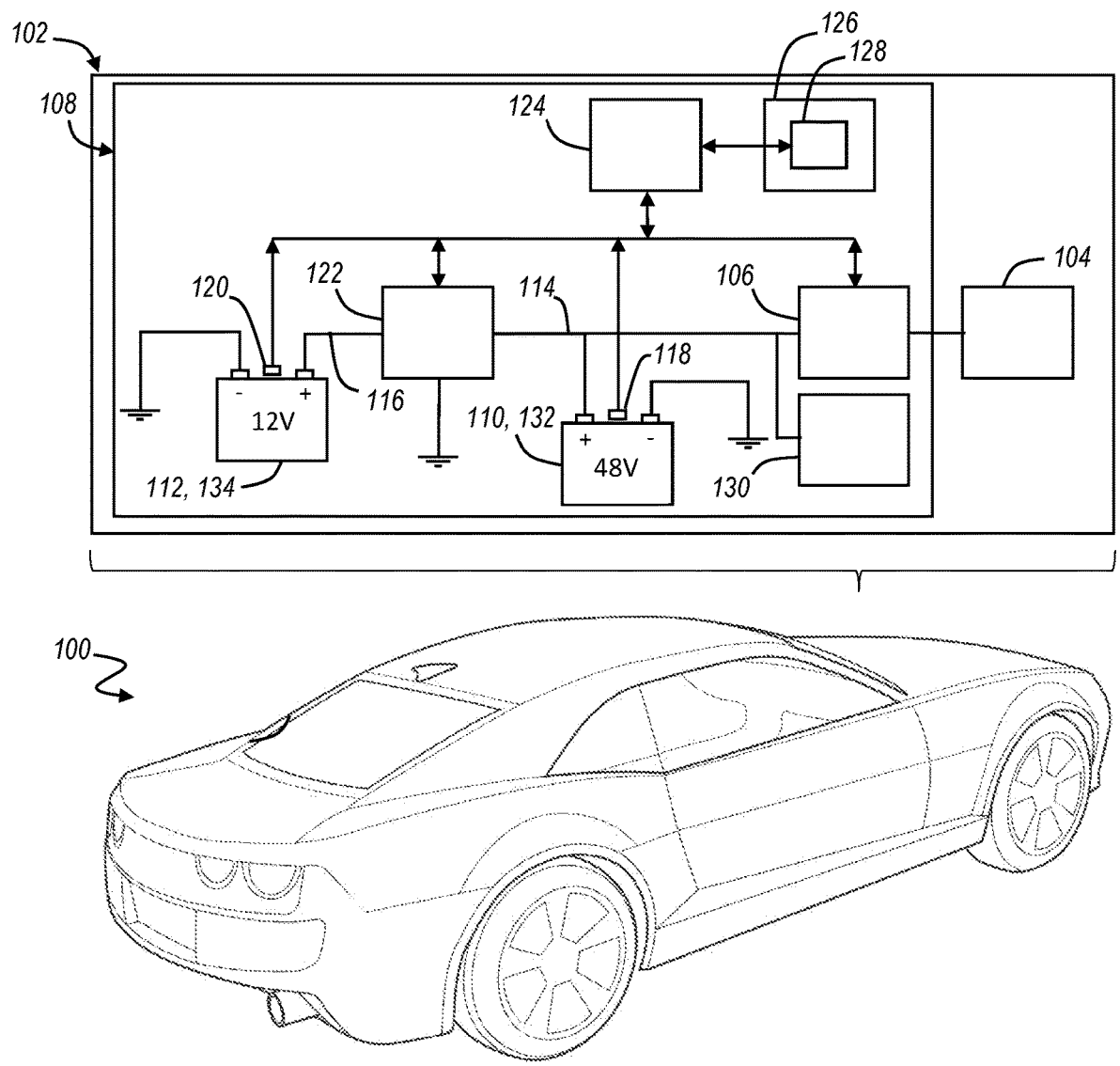
FIG. 1 is a schematic diagram of one example of a vehicle having a propulsion system including an engine and an energy storage system for operating a bidirectional DC/DC power converter in a boost mode, a buck mode, or a standby mode.

Referring to FIG. 1, one example of a motor vehicle 100 has a propulsion system 102 including an internal combustion engine 104, a starter 106, and an energy storage system 108 (ESS) with a plurality of multi-chemistry batteries of different voltages. In this example, the ESS 108 includes first and second batteries 110, 112 electrically coupled to an associated one of first and second voltage buses 114, 116. More specifically, the first battery 110 is a lithium 48-Volt battery electrically coupled to the first voltage bus 114, and the second battery is a 12-Volt lead acid battery electrically coupled to the second voltage bus 116. However, it is contemplated that the ESS 108 can have two or more batteries of different or identical chemistries and voltages. The starter 106 is electrically coupled to the first voltage bus 114 and mechanically coupled to the engine 104 for cranking the engine 104 during a cranking event. The ESS 108 further includes first and second thermocouples 118, 120 for measuring the temperature of an associated one of the first and second batteries 110, 112. The ESS further includes a bidirectional DC/DC power converter 122 ("converter") electrically coupled to the first voltage bus 114 and the second voltage bus 116.

The ESS 108 further includes a controller 124 electrically coupled to the first and second batteries 110, 112, the starter 106, the first and second thermocouples 118, 120, and the converter 122. In this non-limiting example, the controller 124 is an electronic control module ("ECM"). The ESS 108 further includes a memory 126, which is electrically coupled to the controller 124 and stores computer code 128 for execution by the controller 124.

The computer code 128 is configured to operate the converter 122 in a boost mode to transfer power from the second voltage bus 116 to the first voltage bus 114, in response to the controller 124 determining that at least one of: a power capability of the first battery 110 is below a power demand on the first voltage bus 114; a state of charge of the first battery 110 is below a minimum state of charge threshold associated with the first battery 110; and a temperature of the first battery 110 is below a minimum temperature threshold associated with the first battery 110. The computer code 128 is further configured to operate the converter 122 in a buck mode to transfer power from the first voltage bus 114 to the second voltage bus 116, in response to the controller 124 determining that the engine 104 has started.

In this example, the ESS 108 further includes a motor-generator unit 130 ("MGU") for generating power during a battery regeneration event, and the computer code 128 is configured to set the converter to a standby mode to transfer power from the MGU 130 to the first battery 110, in response to the controller 124 determining that: a torque of the MGU 130 is below zero; the power demand on the first voltage bus 114 is above the power of the MGU 130; and at least one of: the state of charge of the first battery 110 is below the minimum state of charge threshold associated with the first battery 110; and the temperature of the first battery 110 is below the minimum temperature threshold associated with the first battery 110. The computer code 128 is further configured to operate the converter 122 in the buck mode to transfer a portion of the power of the MGU 130 from the first voltage bus 114 to the second voltage bus 116, in response to the controller 124 determining that: the power demand on the first voltage bus 114 is below the power of the MGU 130; and a state of charge of the second battery 112 is below a minimum state of charge threshold associated with the second battery 112.

The computer code 128 is configured to set a DC/DC output voltage of the converter 122 to a maximum level, in response to the controller 124 determining that the energy of the first battery 110 is above an energy storage limit associated with the first battery 110. Furthermore, the computer code 128 is configured to set the DC/DC output voltage of the converter 122 based on a regulated voltage control command, in response to the controller 124 determining that the energy of the first battery 110 is below the energy storage limit.

The computer code 128 is configured to operate the converter 122 in the boost mode to provide torque assist by transferring power from the second voltage bus 116 to the first voltage bus 114, in response to the controller 124 determining that: the state of charge of the second battery 112 is above the minimum state of charge threshold associated with the second battery 112; and the power demand for the MGU 130 is above the power capability of the first battery 110.

Figure 2:
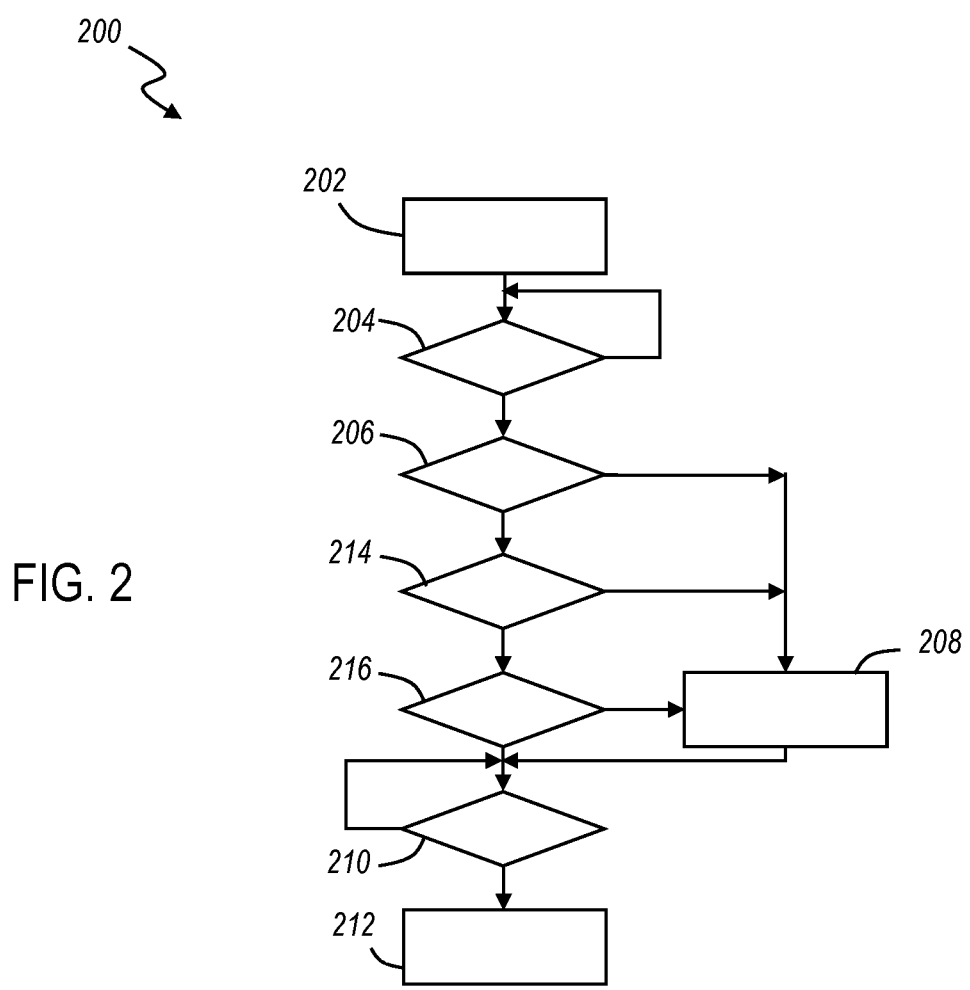
FIG. 2 is a flow chart of one example of a method of operating the energy storage system of FIG. 1, illustrating the converter operating in a boost mode or a standby mode during an engine crank event.

Referring to FIG. 2, there is illustrated a flow chart of one example of a method 200 of operating the ESS 108 of FIG. 1 with the converter 122 in a boost mode or a standby mode during an engine crank event. The method 200 begins at block 202 with converter operating in the standby mode.

At block 204, the controller 124 determines whether an engine crank event has occurred. In this example, the engine crank event can include a driver turning a key in the ignition to request the engine crank or an AutoStart module requesting the engine crank. If the controller 124 determines that the engine crank event has occurred, the method proceeds to block 206. If the controller 124 determines that the engine crank event has not occurred, the method repeats block 204.

At block 206, the controller 124 compares the temperature of the first battery 110 to a minimum temperature threshold associated with the first battery 110. More specifically, in this example, the controller 124 receives first and second temperature signals from an associated one of the first and second thermocouples 118, 120, with the first and second temperature signals being indicative of the temperature of an associated one of the first and second batteries 110, 112. Also, in this example, the first battery 110 is a 48-Volt lithium battery 132, and the controller 124 compares the temperature of the 48-Volt lithium battery 132 to a minimum temperature threshold associated with the 48-Volt lithium battery 132. If the controller 124 determines that the temperature of the first battery 110 is below the minimum temperature threshold associated with the first battery 110, the method 200 proceeds to block 208. If the controller 124 determines that the temperature of the first battery 110 is above the minimum temperature threshold associated with the first battery 110, the method 200 proceeds to block 214.

At block 208, the controller 124 programs the converter 122 to operate in the boost mode to transfer power from the second voltage bus 116 to the first voltage bus 114, such that the power of the second battery 112 supplements the power of the first battery 110 to actuate the starter 106 and crank the engine 104. In addition, the controller 124 sets a DC/DC output voltage of the converter 122 to a maximum level.

At block 210, the controller 124 determines whether the engine start has been completed. If the controller 124 determines that the engine start has been completed, the method 200 proceeds to block 212. If the controller 124 determines that the engine start has not been completed, the method 200 repeats block 210.

At block 212, the controller 124 programs the converter 122 to operate in buck mode to transfer power from the first voltage bus 114 to the second voltage bus 116 and sets the DC/DC output voltage of the converter 122 based on a regulated voltage control command ("RVC command").

At block 214, the controller 124 compares a state of charge of the first battery 110 to a minimum state of charge threshold associated with the first battery 110. Continuing with the previous example, the first battery 110 is a 48-Volt lithium battery 132, and the controller 124 compares a state of charge of the 48-Volt lithium battery 132 to a minimum state of charge threshold associated with the 48-Volt lithium battery 132. If the controller 124 determines that state of charge of the first battery 110 is below the minimum state of charge threshold associated with the first battery 110, the method 200 proceeds to block 208 as described above. If the controller 124 determines that state of charge of the first battery 110 is above the minimum state of charge threshold associated with the first battery 110, the method 200 proceeds to block 216.

At block 216, the controller 124 compares a power capability of the first battery 110 to a power demand on the first voltage bus 114 during the engine crank event. In this example, the first battery 110 is a 48-Volt lithium battery 132 and the starter 106 is a 48-Volt starter 106 electrically coupled to the first voltage bus 114, such that the controller 124 compares the power capability of the 48-Volt lithium battery 132 to a power demand on the first voltage bus 114 associated with the 48-Volt starter 106. If the controller 124 determines that the power capability of the first battery 110 is below the power demand on the first voltage bus 114, the method 200 proceeds to block 208 as described above. If the controller 124 determines that the power capability of the first battery 110 is above the power demand on the first voltage bus 114, the method 200 proceeds to block 210 as described above.

Figure 3:
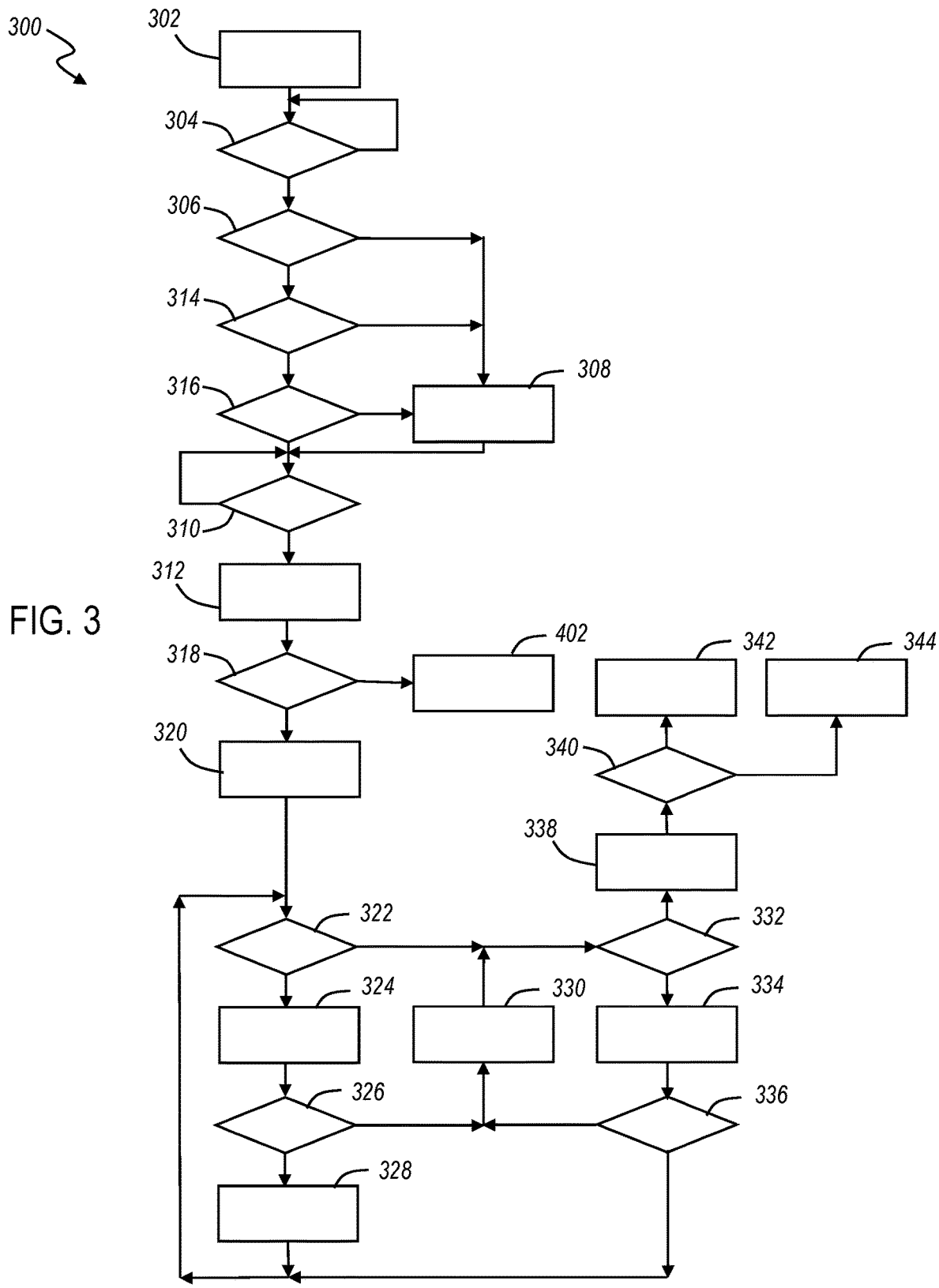
FIG. 3 is a flow chart of another example of a method of operating the energy storage system of FIG. 1, illustrating the converter operating in a buck mode or the standby mode during a battery regeneration event.

Referring to FIG. 3, there is illustrated a flow chart of another example of a method 300 of operating the ESS 108 of FIG. 1. The method 300 is similar to the method 200 of FIG. 2 and includes the same steps 202 through 212 identified by the same reference numbers increased by 100. However, the method 300 includes additional steps as described in detail below.

At block 318, the controller 124 determines whether a torque of the MGU 130 is below zero so as to indicate a battery regeneration event. If the controller 124 determines that the torque of the MGU 130 is below zero, the method 300 proceeds to block 320. If the controller 124 determines that the torque of the MGU 130 above zero, the method 300 proceeds to block 402 to operate the converter 122 and provide torque assist. as detailed in the description for FIG. 4.

At block 320, the controller 124 receives signals from the batteries 110, 112, the thermocouples 118, 120, the memory 126, or any combination of the same, with the signals indicating multiple parameters of the batteries 110, 112. Examples of these parameters include the state of charge of each battery, maximum voltage, minimum voltage, power capability, current temperature, and temperature thresholds of the associated batteries.

At block 322, the controller 124 compares the state of charge of the first battery 110 to the minimum state of charge threshold associated with the first battery. Continuing with the previous example, the first battery is the 48-Volt lithium battery, and the controller 124 compares the state of charge of the 48-Volt lithium battery 132 to the minimum state of charge threshold associated with the 48-Volt lithium battery. In addition, the controller 124 compares the temperature of the first battery to the minimum temperature threshold associated with the first battery. In this example, the controller 124 compares the temperature of the 48-Volt lithium battery to the minimum temperature threshold associated with the 48-Volt lithium battery. If either the state of charge of the first battery 110 is below the minimum state of charge threshold or if the temperature of the first battery is below the minimum temperature threshold, the method 300 proceeds to block 324. If the state of charge of the first battery 110 is above the minimum state of charge threshold and if the temperature of the first battery is above the minimum temperature threshold, the method 300 proceeds to block 332.

At block 324, the controller 124 determines the power demand on the first voltage bus 114. The power demand can be associated with the power required to operate electrical machines electrically coupled to the first voltage bus 114.

At block 326, the controller 124 compares the power demand on the first voltage bus 114 to the power generated by the MGU 130. If the controller 124 determines that the power demand is above the power of the MGU 130, the method 300 proceeds to block 328. If the controller 124 determines that the power demand is below the power generated by the MGU 130, the method 300 proceeds to block 330.

At block 328, the controller 124 sets the converter 122 to standby mode and directs all regeneration energy to the first battery 110. In this example, the first battery 110 is the 48-Volt lithium battery 132, and the controller 124 sets the converter 122 to standby mode and directs all regeneration energy to the 48-Volt lithium battery 132. The method then returns to block 322.

At block 330, the controller 124 sets the converter 122 to operate in buck mode to transfer power generated by the MGU 130 to the first battery 110 within the power capability of the first battery 110 and sets the output voltage of the converter 122 to transfer a portion of the regeneration power generated by the MGU 130, which is in excess of the power capability of the first battery 110, to the second battery 112. In this example, the first battery 110 is the 48-Volt lithium battery 132, and the second battery 112 is the 12-Volt lead acid battery 134. The controller 124 sets the converter 122 to operate in buck mode to transfer power generated by the MGU 130 to the 48-Volt lithium battery 132 within the power capability of the 48-Volt lithium battery 132 and sets the output voltage of the converter 122 to transfer a portion of the regeneration power generated by the MGU 130, which is in excess of the power capability of the 48-Volt lithium battery 132, to the 12-Volt lead acid battery 134.

At block 332, the controller 124 compares the state of charge of the second battery 112 to the minimum state of charge threshold associated with the second battery. Continuing with the previous example, the second battery is the 12-Volt lead acid battery, and the controller 124 compares the state of charge of the 12-Volt lead acid battery 134 to the minimum state of charge threshold associated with the 12-Volt lead acid battery. If the state of charge of the second battery 112 is below the minimum state of charge threshold, the method 300 proceeds to block 334. If the state of charge of the first battery 110 is above the minimum state of charge threshold, the method 300 proceeds to block 338.

At block 334, the controller 124 determines the power demand on the first voltage bus 114. The power demand can be associated with the power required to operate electrical machines electrically coupled to the first voltage bus 114.

At block 336, the controller 124 compares the power demand on the first voltage bus 114 to the power generated by the MGU 130. If the controller 124 determines that the power demand is below the power generated by the MGU 130, the method 300 proceeds to block 330. If the controller 124 determines that the power demand is above the power generated by the MGU 130, the method 300 returns to block 322.

At block 338, the controller 124 determines the maximum regeneration energy produced by the MGU 130.

At block 340, the controller 124 compares the maximum regeneration energy generated by the MGU 130 with the maximum energy capability of the first battery 110. If the controller 124 determines that the maximum regeneration energy generated by the MGU 130 is below the maximum energy capability of the first battery 110, the method proceeds to block 342. If the controller 124 determines that the maximum regeneration energy produced by the MGU 130 is above the maximum energy capability of the first battery 110, the method proceeds to block 344.

At block 342, the controller 124 sets the DC/DC output voltage of the converter 122 based on the RVC command.

At block 344, the controller 124 sets the DC/DC output voltage of the converter 122 to the maximum level.

Figure 4:
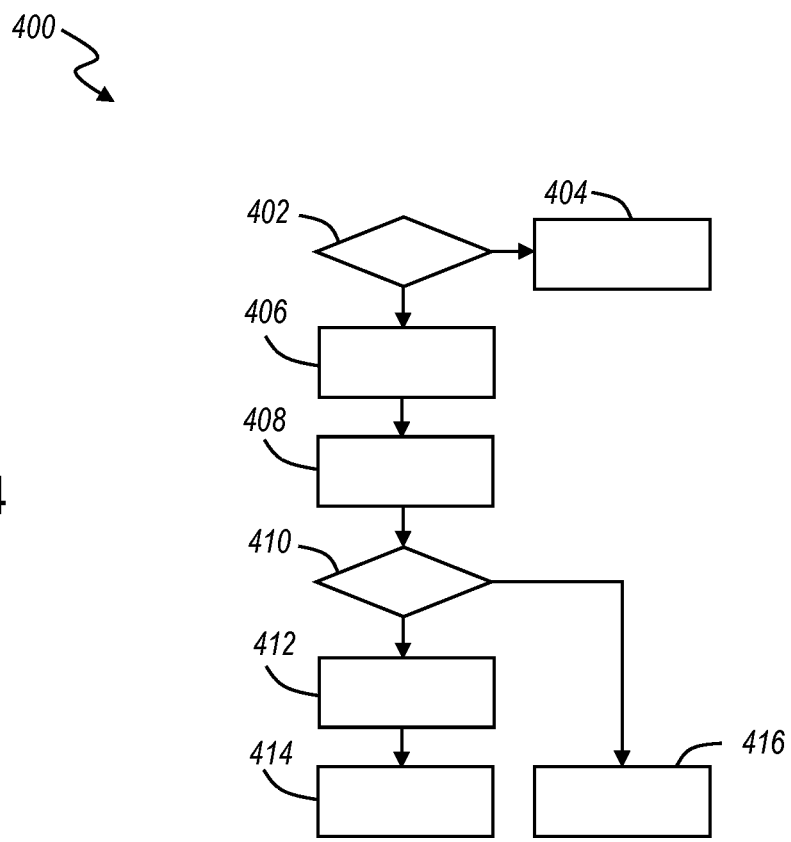
FIG. 4 is a flow chart of yet another example of a method of operating the energy storage system of FIG. 1, illustrating the converter operating in a boost mode during a torque assist event.

Referring to FIG. 4, there is illustrated a flow chart of another example of a method 400 of operating the ESS 108 of FIG. 1. The method 400 is similar to the method 300 of FIG. 3 and includes the same steps 302 through 344. However, the method 400 includes additional steps beginning with block 402 (as introduced in FIG. 3) and described in detail below.

At block 402, the controller 124 compares the state of charge of the second battery 112 to a minimum state of charge threshold associated with the second battery 112. Continuing with the previous example, the second battery 112 is a 12-Volt lead acid battery 134, and the controller 124 compares the state of charge of the 12-Volt lead acid battery 134 to a minimum state of charge threshold associated with the 12-Volt lead acid battery 134. If the controller 124 determines that the state of charge of the second battery 112 is below the minimum state of charge threshold, the method 400 proceeds to block 404 where the controller 124 sets the converter in standby mode and the method 400 terminates. If the controller 124 determines that the state of charge of the second battery 112 is above the minimum state of charge threshold, the method 400 proceeds to block 406.

At block 406, the controller 124 receives signals from the batteries 110, 112, the thermocouples 118, 120, the memory 126, or any combination of the same, with the signals indicating multiple parameters of the batteries 110, 112. Examples of these parameters include the state of charge of each battery, maximum voltage, minimum voltage, power capability, current temperature, and temperature thresholds of the associated batteries.

At block 408, the controller 124 determines the power capability of the first battery 110. In this example, the first battery 110 is the 48-Volt lithium battery 132, and the controller 124 determines the power capability of the 48-Volt lithium battery 132.

At block 410, the controller 124 compares the power demand on the first voltage bus 114 and the MGU 130 to the power capability of the first battery 110. In this example, the first battery 110 is the 48-Volt lithium battery 132, and the controller 124 compares the power capability of the 48-Volt lithium battery 132 to the power demand on the first voltage bus 114 by the MGU 130 the controller 124. If the controller 124 determines that the power demand on the first voltage bus 114 and MGU 130 is above the power capability of the first battery 110, the method 400 proceeds to block 412. If the controller 124 determines that the power demand on the first voltage bus 114 and MGU 130 is below the power capability of the first battery 110, the method 400 proceeds to block 416.

At block 412, the controller 124 sets the converter 122 to operate in boost mode to provide torque assist by transferring power from the second voltage bus 116 to the first voltage bus 114 such that the MGU 130 receives power from the first and second batteries 110, 112.

At block 414, the controller 124 sets the output voltage of the converter 122 to match charging output level, such that the combined first and second batteries provide power that matches the power demand of the MGU 130.

At block 416, the controller 124 sets the output voltage of the converter 122 based on the RVC command, such that the first battery 110 provides power that matches the power demand of the MGU 130.

Figure 5:
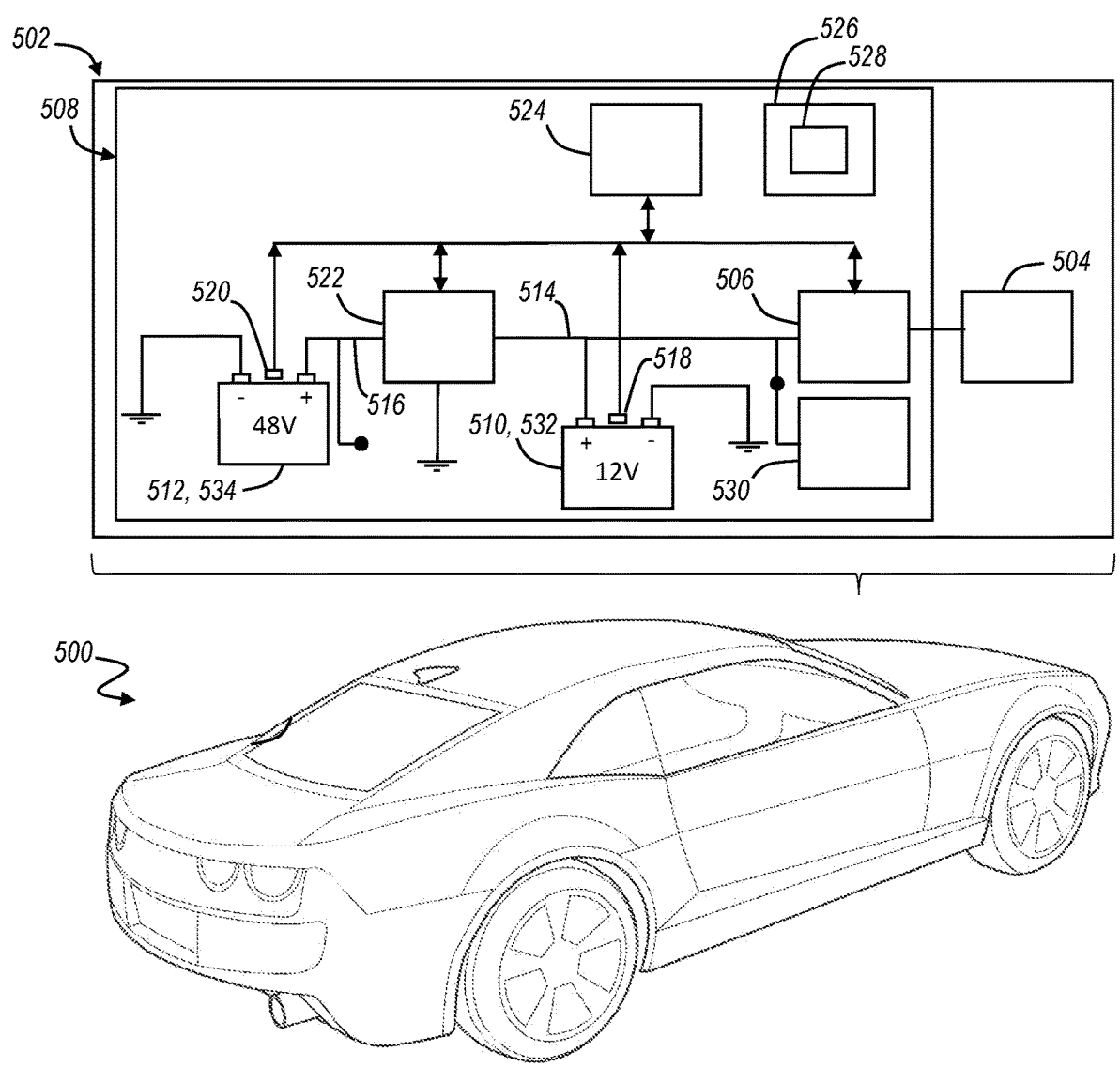
FIG. 5 is a schematic diagram of another example of the vehicle of FIG. 1.

Referring to FIG. 5, there is illustrated another example of an ESS 508, which is similar to the ESS 108 of FIG. 1 and has the same components identified by the same numbers increased by 400. However, while the ESS 108 of FIG. 1 includes the first battery 110 in the form of the 48-Volt lithium battery 132 electrically coupled to the first voltage bus 114 and the second battery 112 in the form of the 12-Volt lead acid battery 134 electrically coupled to the second voltage bus 116, the ESS 508 includes a first battery 510 in the form of a 12 Volt lead acid battery 534 electrically coupled to a first voltage bus 514 and a second battery 512 in the form of a 48 Volt lithium battery 532 electrically coupled to a second voltage bus 516.

Figure 6:
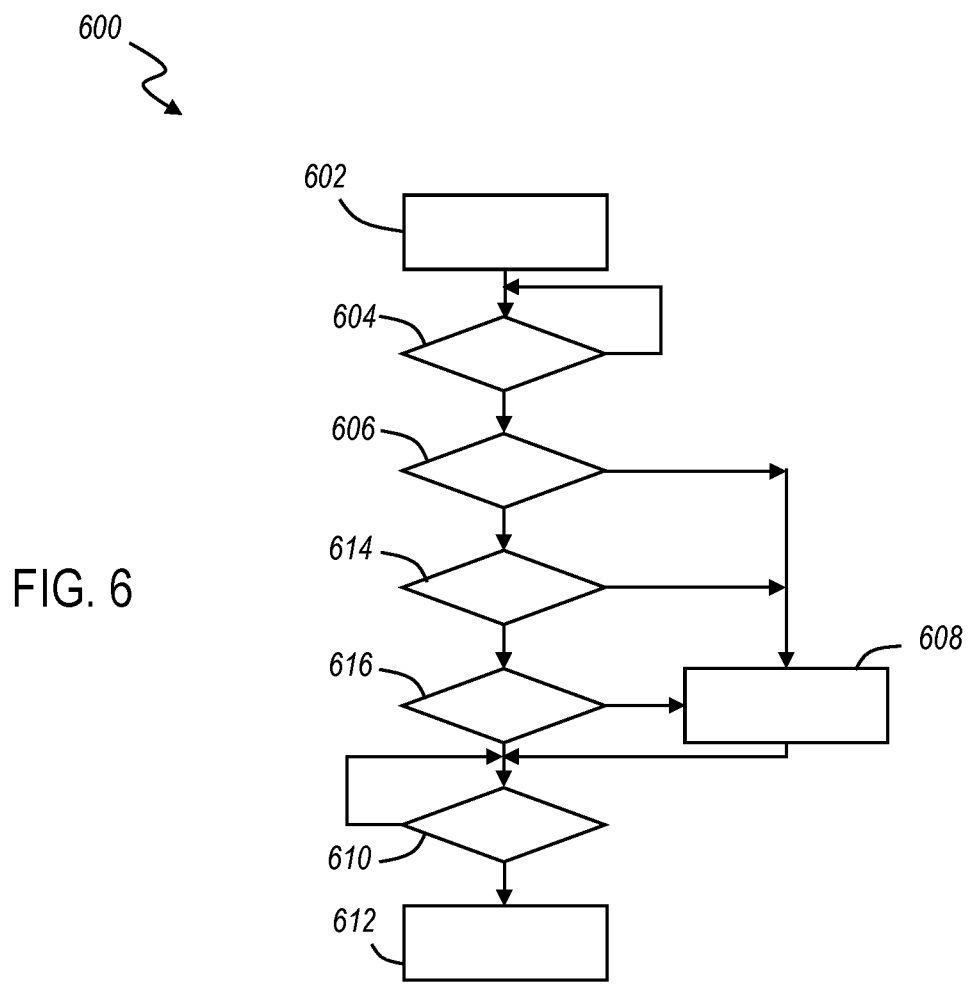
FIG. 6 is a flow chart of one example of a method of operating the energy storage system of FIG. 5, illustrating the converter operating in a buck mode or a standby mode during an engine crank event.

Referring to FIG. 6, there is illustrated a flow chart of another example of a method 600 of operating the ESS 508 of FIG. 5. The method 600 is similar to the method 200 of FIG. 2 and includes the same steps 202 through 212 identified by the same reference numbers increased by 400. However, while the first battery 110 for the method 200 is the 48-Volt lithium battery 132 and the second battery 112 for the method 200 is the 12-Volt lead acid battery 134, the first battery 510 is a 12-Volt lead acid battery 534 and the second battery 512 is a 48-Volt lithium battery 532.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. An energy storage system for a propulsion system of a motor vehicle, the energy storage system comprising:
a first battery electrically coupled to a first voltage bus;
a second battery electrically coupled to a second voltage bus;
a bidirectional DC/DC power converter electrically coupled to the first voltage bus and the second voltage bus;
a starter electrically coupled to the first voltage bus and mechanically coupled to an engine for cranking the engine during a cranking event;
a controller electrically coupled to the first battery, the second battery, and the bidirectional DC/DC power converter; and
a memory electrically coupled to the controller and storing computer code for execution by the controller, and the computer code is configured to operate the bidirectional DC/DC power converter in a boost mode to transfer power from the second voltage bus to the first voltage bus in response to the controller determining that at least one of:
a power capability of the first battery is below a power demand on the first voltage bus;
a state of charge of the first battery is below a minimum state of charge threshold associated with the first battery; and
a temperature of the first battery is below a minimum temperature threshold associated with the first battery.

2. The energy storage system of claim 1 wherein the computer code is configured to operate the bidirectional DC/DC power converter in a buck mode to transfer power from the first voltage bus to the second voltage bus in response to the controller determining that the engine has started.

3. The energy storage system of claim 2 further comprising a motor-generator unit for generating power during a battery regeneration event, and the computer code is configured to set the bidirectional DC/DC power converter to a standby mode to transfer power from the motor-generator unit to the first battery in response to the controller determining that:
a torque of the motor-generator unit is below zero;
the power demand on the first voltage bus is above the power generated by the motor-generator unit; and
at least one of:
the state of charge of the first battery is below the minimum state of charge threshold associated with the first battery; and
the temperature of the first battery is below the minimum temperature threshold associated with the first battery.

4. The energy storage system of claim 3 wherein the computer code is configured to operate the bidirectional DC/DC power converter in the buck mode to transfer a portion of the power of the motor-generator unit from the first voltage bus to the second voltage bus in response to the controller determining that:
the power demand on the first voltage bus is below the power generated by the motor-generator unit; and
a state of charge of the second battery is below a minimum state of charge threshold associated with the second battery.

5. The energy storage system of claim 4 wherein the computer code is configured to set a DC/DC output voltage of the bidirectional DC/DC power converter to a maximum level in response to the controller determining that the energy of the first battery is above an energy storage limit associated with the first battery.

6. The energy storage system of claim 5 wherein the computer code is configured to set the DC/DC output voltage of the bidirectional DC/DC power converter based on a regulated voltage control command in response to the controller determining that the energy of the first battery is below the energy storage limit.

7. The energy storage system of claim 6 wherein the computer code is configured to operate the bidirectional DC/DC power converter in the boost mode to provide torque assist by transferring power from the second voltage bus to the first voltage bus in response to the controller determining that:
the state of charge of the second battery is above the minimum state of charge threshold associated with the second battery; and
the power demand for the motor-generator unit is above the power capability of the first battery.

8. The energy storage system of claim 1 wherein the first battery is a 48-Volt battery, and the second battery is a 12-Volt battery.

9. A method of operating an energy storage system of a propulsion system for a motor vehicle, the energy storage system including a first battery electrically coupled to a first voltage bus, a second battery electrically coupled to a second voltage bus, a bidirectional DC/DC power converter, a starter, a motor-generator unit, a controller, and a memory storing computer code, the method comprising:

comparing, using the controller, a power capability of the first battery to a power demand on the first voltage bus during an engine crank event;

comparing, using the controller, a state of charge of the first battery to a minimum state of charge threshold associated with the first battery;

comparing, using the controller, a temperature of the first battery to a minimum temperature threshold associated with the first battery; and transferring, by operating the bidirectional DC/DC power converter in a boost mode, power from the second voltage bus to the first voltage bus in response to the controller determining that at least one of:

the power capability of the first battery is below the power demand on the first voltage bus during the engine crank event;

the state of charge of the first battery is below the minimum state of charge threshold associated with the first battery; and the temperature of the first battery is below the minimum temperature threshold associated with the first battery.

10. The method of claim 9 further comprising transferring, by operating the bidirectional DC/DC power converter in a buck mode, power from the first voltage bus to the second voltage bus in response to the controller determining that the engine has started.

11. The method of claim 10 further comprising:

determining, using the controller, a battery regeneration event in response to the controller determining that a torque of the motor-generator unit is below zero;

comparing, using the controller, a power demand on the first voltage bus to a power of the motor-generator unit;

comparing, using the controller, the state of charge of the first battery to a minimum state of charge threshold associated with the first battery;

comparing, using the controller, the temperature of the first battery to a minimum temperature threshold associated with the first battery; and directing, by operating the bidirectional DC/DC power converter in the stand-by mode, power from motor-generator unit to the first battery in response to the controller determining that:

the power demand on the first voltage bus is above the power generated by the motor-generator unit; and at least one of:

the state of charge of the first battery is below the minimum state of charge threshold associated with the first battery; and the temperature of the first battery is below the minimum temperature threshold associated with the first battery.

12. The method of claim 11 further comprising:

comparing, using the controller, a state of charge of the second battery to a minimum state of charge threshold associated with the second battery; and transferring, by operating the bidirectional DC/DC power converter in the buck mode, a portion of the power of the motor-generator from the first voltage bus to the second voltage bus in response to the controller determining that:

the power demand on the first voltage bus is below the power generated by the motor-generator unit; and the state of charge of the second battery is below the minimum state of charge threshold associated with the second battery.

13. The method of claim 12 further comprising:

comparing, using the controller, an energy of the first battery to an energy storage limit associated with the first battery;

setting, using the controller, a DC/DC output voltage of the bidirectional DC/DC power converter to a maximum level in response to the controller determining that the first battery is above the energy storage limit; and setting, using the controller, the DC/DC output voltage of the bidirectional DC/DC power converter based on a regulated voltage control command in response to the controller determining that the first battery is below the energy storage limit.

14. The method of claim 13 further comprising:

comparing, using the controller, the power demand of the motor-generator unit to the power capability of the first battery; and providing torque assist, by operating the bidirectional DC/DC power converter in the boost mode, to transfer power from the second voltage bus to the first voltage bus in response to the controller determining that:

the state of charge of the second battery is above the minimum state of charge threshold associated with the second battery; and the power demand for the motor-generator unit is above the power capability of the first battery.

15. A method of operating an energy storage system of a propulsion system for a motor vehicle, the energy storage system including a 48-Volt battery electrically coupled to a first voltage bus, a 12-Volt battery electrically coupled to a second voltage bus, a bidirectional DC/DC power converter, a starter, a controller, and a memory storing computer code, the method comprising:

comparing, using the controller, a power capability of the 48-Volt battery to a power demand on the first voltage bus during an engine crank event;

comparing, using the controller, a state of charge of the 48-Volt battery to a minimum state of charge threshold associated with the 48-Volt battery;

comparing, using the controller, a temperature of the 48-Volt battery to a minimum temperature threshold associated with the 48-Volt battery; and transferring, by operating the bidirectional DC/DC power converter in a boost mode, power from the second voltage bus to the first voltage bus in response to the controller determining that at least one of:

the power capability of the 48-Volt battery is below the power demand on the first voltage bus during the engine crank event;

the state of charge of the 48-Volt battery is below the minimum state of charge threshold associated with the 48-Volt battery; and the temperature of the 48-Volt battery is below the minimum temperature threshold associated with the 48-Volt battery.

16. The method of claim 15 further comprising transferring, by operating the bidirectional DC/DC power converter in a buck mode, power from the first voltage bus to the second voltage bus in response to the controller determining that the engine has started.

17. The method of claim 16 further comprising:
determining, using the controller, a battery regeneration event in response to the controller determining that a torque of the motor-generator unit is below zero;
comparing, using the controller, a power demand on the first voltage bus to a power of the motor-generator unit;
comparing, using the controller, the state of charge of the 48-Volt battery to a minimum state of charge threshold associated with the 48-Volt battery;
comparing, using the controller, the temperature of the 48-Volt battery to a minimum temperature threshold associated with the 48-Volt battery; and
directing, by operating the bidirectional DC/DC power converter in the buck mode, power from motor-generator unit to the 48-Volt battery in response to the controller determining that:
 the power demand on the first voltage bus is above the power generated by the motor-generator unit; and
 at least one of:
  the state of charge of the 48-Volt battery is below the minimum state of charge threshold associated with the 48-Volt battery; and
  the temperature of the 48-Volt battery is below the minimum temperature threshold associated with the 48-Volt battery.

18. The method of claim 17 further comprising:
comparing a state of charge of the 12-Volt battery to a minimum state of charge threshold associated with the 12-Volt battery; and
transferring, by operating the bidirectional DC/DC power converter in the buck mode, a portion of the power of the motor-generator from the first voltage bus to the second voltage bus in response to the controller determining that:
 the power demand on the first voltage bus is below the power generated by the motor-generator unit; and
 the state of charge of the 12-Volt battery is below the minimum state of charge threshold associated with the 12-Volt battery.

19. The method of claim 18 further comprising:
comparing an energy of the 48-Volt battery to an energy storage limit associated with the 48-Volt battery;
setting, using the controller, a DC/DC output voltage of the bidirectional DC/DC power converter to a maximum level in response to the controller determining that the 48-Volt battery is above the energy storage limit; and
setting, using the controller, the DC/DC output voltage of the bidirectional DC/DC power converter based on a regulated voltage control command in response to the controller determining that the 48-Volt battery is below the energy storage limit.

20. The method of claim 19 further comprising:
comparing, using the controller, the power demand of the motor-generator unit to the power capability of the 48-Volt battery; and
providing torque assist, by operating the bidirectional DC/DC power converter in the boost mode, to transfer power from the second voltage bus to the first voltage bus in response to the controller determining that:
 the state of charge of the 12-Volt battery is above the minimum state of charge threshold associated with the 12-Volt battery; and
 the power demand on the first voltage bus by the motor-generator unit is above the power capability of the 48-Volt battery.

* * * * *